Aug. 3, 1965   R. D. LE GRAND   3,197,813
DUAL TEMPERATURE MELTING APPARATUS
Filed Dec. 18, 1962   2 Sheets-Sheet 1
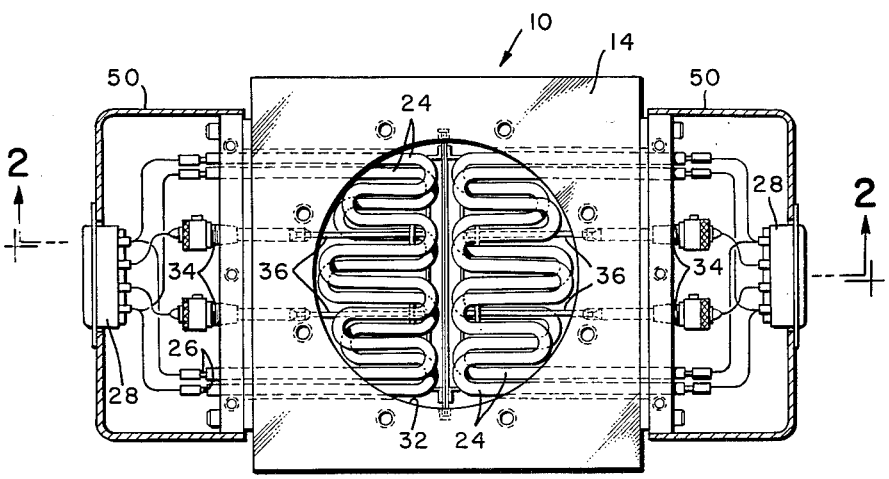
FIG.I.
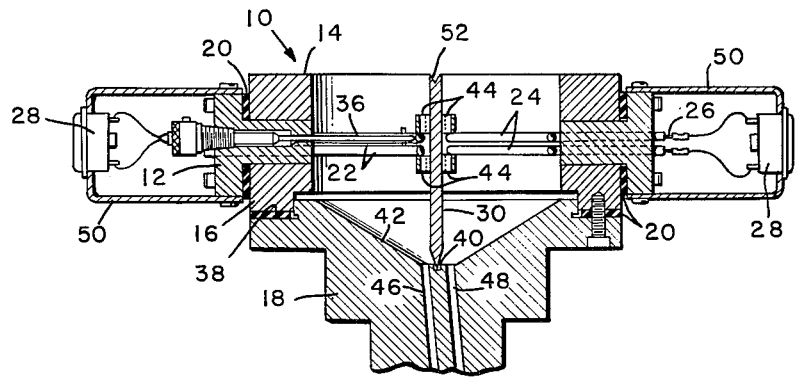
FIG.2.
*INVENTOR.*
RICHARD D. LeGRAND
BY
ATTORNEY

3,197,813
DUAL TEMPERATURE MELTING APPARATUS
Richard D. Le Grand, Cary, N.C., assignor to Monsanto Company, a corporation of Delaware
Filed Dec. 18, 1962, Ser. No. 245,568
4 Claims. (Cl. 18—8)

This invention relates generally to an apparatus for the manufacture of thread-like or ribbon-like products from thermoplastic linear polymers such as polyamides, polyesters, or polyurethanes, and more particularly to an improved system for the melt spinning of such polymers under precisely controlled conditions of temperature.

In the manufacture of filaments from highly polymeric, filament-forming compositions by melt-spinning procedures, the polymer to be shaped into filaments is normally heated to its point of fusion, but below its decomposition temperature. The melted mass is then extruded at a constant rate and under pressure through small orifices in a spinneret to form continuously melting streams of polymer of relatively small diameters.

In one commercial process for producing textile filaments from polycarbonamides, which may be made from a suitable diamine and a suitable dibasic acid, the polymer, in a flake or chip-like form, is melted by being brought into contact with a heated surface or grid in a melting container; the resulting melt is then metered to and through the orifices of a spinneret by means of a metering pump.

With the recently renewed interest in conjugated filaments, there has arisen a need for melting apparatus adapted to the peculiar problems encountered in attempting to spin such filaments. Briefly, a conjugated filament is one composed of two or more filament-forming materials of differing properties, which materials are transformed into their fused or plasticized state, or in the form of solutions thereof, and are extruded in separate or only partially intermingled phases through a common orifice or a plurality thereof, whereupon they are joined together in eccentric or side-by-side relation into a setting medium (which may be either gaseous or liquid, functioning either by cooling, precipitation, or evaporative effect) to form unitary filaments in each of which the different materials form separate portions of the cross-section of the filament. Selective after-treatments, made with a view to the differing properties of the component materials of these filaments, such as heating to effect differential shrinkage, to give an inherent spiral crimp, for example, result in the enhancement of bulk, hand, appearance, etc.

In melt spinning such conjugated filaments, the situation is often encountered where the two or more spinnable mediums to be employed have different temperatures of degradation normally accompanied by a like difference in their melting points. If such mediums are heated to the higher melting point, degradation will likely occur in those mediums having lower melting points. It is therefore desirable that some means be made available whereby spinnable mediums of different melting points may each be melted according to its own melting point just prior to extrusion into filamentary form.

It is therefore an object of this invention to provide an apparatus for use in melting two or more spinnable mediums in accordance with their respective melting points in order to minimize the possibility of degradation and resulting gelation. It is a further object of this invention to provide a dual-temperature melting grid designed to receive and fuse simultaneously at least two spinnable mediums having, permissibly, differing melting points. It is still another object of this invention to provide a melting grid assembly of such configuration as to provide uniform heater tube embedment and which configuration further assures maximum uniformity of temperature through selected zones of the heater block. Yet another object of my invention is to provide a melting grid assembly for use in spinning conjugated filaments, wherein two or more spinnable mediums of possibly different melting temperatures are maintained in thermally and fluidly discrete zones, each according to its own characteristics.

In accordance with one aspect of my invention, the foregoing and other objects are obtained by providing a dual-temperature melt grid assembly which incorporates the use of at least two thermally insulated, independently controlled heated grids juxtaposed within a common melt block and feeding a dual-channeled pump block. By this means two or more spinnable mediums having different melting points may be selectively transformed to their fused condition in a manner which minimizes the tendency toward degradation and resulting gelation.

In accordance with another aspect of my invention these and other objects are served by providing a melt grid assembly incorporating the use of a melt block having a rectangular throat and being of constant cross-section, whereby equal heater element embedment is possible, thereby minimizing the occurrence of hot spots, and whereby temperature differential along selected sections of the melt block body due to variations in mass distribution of the block is eliminated.

The nature of the invention will be better understood by reference to the following description, taken in conjunction with the accompanying drawings in which certain specific embodiments thereof have been set forth for the purpose of illustration, and not limitation, and in which:

FIG. 1 is a partially sectionalized plan view of the melt grid assembly showing one possible configuration of separately controlled groups of heater elements arranged in the throat of the melt block;

FIG. 2 is a sectional view taken on line 2—2 of FIG. 1, and

Figure 3:
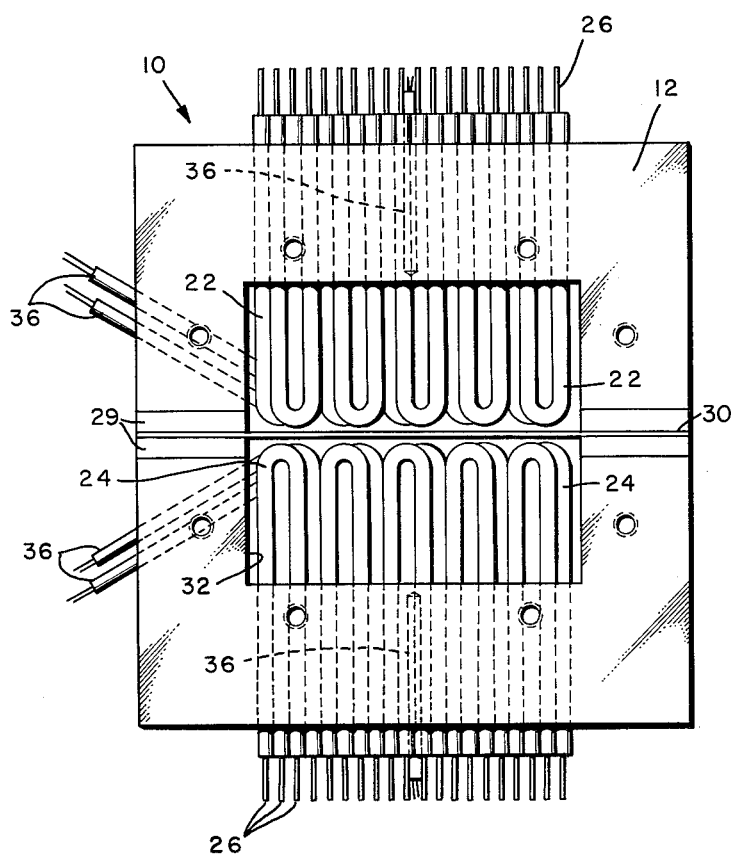
FIG. 3 is a plan view similar to that of FIG. 1 showing a modified configuration of the melt block.

Referring now in detail to the drawings and more particularly to FIGS. 1 and 2, there is shown a melt grid assembly, generally designated by a reference numeral 10, which basically comprises a melt block 12 sandwiched between upper and lower adaptor blocks 14, 16, respectively. The melt block and adaptor blocks may be of any suitable peripheral outline, a rectangular one being shown, and the cross-sectional configuration of the melt block is likewise non-critical, the T-shaped configuration shown in FIGS. 1 and 2 being chosen out of consideration of compactness and accessibility of the component parts of the total package. The upper adaptor block 14 serves as a transition piece between a suitably compartmented feeder hopper, not shown, and the melt block 12, which feeder hopper is adapted to store and convey discrete quantities of flake or chip-like material to selected zones of the melting grid. The lower adaptor block 16 serves a like function between the melt block 12 and the dual-channeled pump block 18. Obviously, suitable modifications of the cross-sectional configuration of the melt block 12 may be effected whereby the adaptor blocks 14, 16 may be eliminated and the melt block placed in direct contact with the hopper along its upper face and the pump block along its lower face. Gaskets 20 of any desired heat insulated material may be provided between the melt block and the two adaptor blocks to minimize any heat transfer within the component parts of the melt grid assembly.

The melt block 12 serves to mount a plurality of independently controlled sets of heater elements, two being illustrated, which heater elements are shown in the form of continuous hollow tubes, preferably of stainless steel, which may be shaped to any desired pattern, such as the continuous, repeating S-shape shown, the only limitation being the maintenance of a uniform spacing between adjacent portions of the heater elements. The size of the gaps or spacing between adjacent portions of the heater tubes is such as will prevent passage of the particular sized flakes or chips being handled prior to their melting. Alternatively, a screen of suitable mesh may be placed adjacent the upper surface of the heater tubes to perform the same function. Extending through the heater tubes is conventional resistance wiring 26 which extends beyond the terminal portions of the tubes to connect with power terminals provided in jack box 28. Obviously, heater elements other than the electrical resistance type shown may well be employed, such as fluid-type heat exchangers.

A vertically extending partition or divider 30 serves to divide the throat 32 of the melt block assembly into two substantially equal zones, each zone being occupied by one set of independently controllable heater elements. Although the heater elements in each zone are shown in the drawings to be double-stacked, one or more layers of heater elements may be employed.

Also mounted in the melt block 12, there are provided suitably placed thermocouple plugs 34 which serve to mount and interconnect the thermocouple probes 36 with the jack boxes 28. As shown in the drawings, it has been found preferable to provide two thermocouple installations in each of the two zones, the two thermocouples of a given zone being spaced vertically where it is desired to employ more than one layer of heater elements, which interrelationship is best viewed in FIG. 2.

As shown in FIG. 2, the dual-channeled pump block 18 is shaped to mate with the bottom surface of the lower adaptor block 16 which rests on the laterally outwardly extending flange 38 of the pump block. The upper end of the pump block, as viewed in FIG. 2, is seen to be provided with a melt pool 42 in the form of a substantially conical depression of a base diametrical dimension approximating the throat diameter of the melt block 12 and the adaptor blocks 14, 17. The divider 30 is seen to extend beyond the lower adaptor block 16 to engage a slot 40 extending diametrically across the bottom of the melt pool 42. To promote a more fluid-tight engagement of the divider with the slot, the bottom edge of the divider may be tapered. In order to maintain the inner extremities of the heater elements in their proper spaced relationship, there are provided suitable support brackets 44 which are mounted integrally with the divider 30 to extend laterally outward from either face thereof. The positioning of the upper thermocouple probe in the left hand zone, as viewed in FIG. 2, is shown to be one wherein the probe terminates just short of actual contact with the upper heater element, this position having been found to give the most accurate results. The remaining thermocouple probes are similarly positioned with respect to their neighboring heating elements.

A pump block 18 that may beneficially be used in conjunction with the melt grid assembly of this invention is provided with dual feeder passages 46, 48, which are laterally spaced and intervened at their upper extremities by the divider 30, whereby each feeder passage is supplied by a separate zone of the melt grid. The conically shaped melt pool 42 performs the function of a reservoir for the melted spinnable mediums which are then conveyed by their respective feeder passage to separate metering pumps, thence to a suitable spinneret assembly of such design as to effect the desired merging of the then-tofore separate streams.

It may be found desirable to enclose the terminal portions of the heater tubes, resistance wiring and leads to the jack boxes by a suitable housing such as cover 50. The separate heater elements are controlled by conventional temperature regulating devices not comprising a part of the present invention which would be connected by way of the jack box 28.

As viewed in FIG. 2 the upper edge of the divider 30 is provided with an edge-wise extending groove 52 shaped to engage with the tapered lower edge of a similar divider mounted in a feeder hopper, not shown.

In operation, separate spinnable mediums in granular, flake, or chip-like form, are supplied, each to separate zone of the melt grid such as that shown in FIGS. 1 and 2. It is, of course, obvious that the melt block 12 may be partitioned into any number of separate zones, each served by its own individually controllable heater element or elements and each fed by a different spinnable medium of any desired melting temperature. Should it be desired to spin conventionally with the present melt grid, that is, using a single spinnable medium, this may be accomplished simply by removing the divider 40 and maintaining the individually controllable heater elements at equal temperatures, the effect being that of the single heater grid normally employed.

Reference will now be had to another embodiment of the melt block as shown in FIG. 3, which block is of such configuration as to minimize temperature variations therealong and which configuration also results in equal heater element embediment. As there shown, such a melt block configuration takes the shape, when in assembled position, of an annulus, preferably of rectangular outline and having a rectangular throat, although an annulus of any other desired configuration, such as circular, for example, may as well be employed, the only limitation being that the block be of uniform cross-section throughout its extent, or throughout the extent of selected zones thereof. To promote minimized heat transfer between the two zones of the melt grid shown in FIG. 3, the block is fabricated in the form of two substantially identical halves interspaced, in their assembled condition, by suitable insulation and divider 30 similar to that of the embodiments of FIGS. 1 and 2. In all other respects the melt grid assembly of FIG. 3 is susbtantially like that of FIGS. 1 and 2.

Obviously numerous modifications and variations of the present invention are possible in the light of the above teachings. It is therefore to be understood that, within the scope of the appended claims, the invention may be practiced otherwise than as specifically described herein.

What is claimed is:

1. In a spinning apparatus for use in the melt spinning of a conjugated filament composed of at least two separate spinnable mediums of possibly differing melting points, a dual-temperature melting grid comprising a melt block having a relatively large opening extending therethrough, said opening being divided along its lengthwise dimension by a partition means of thermal insulating properties to thereby define at least two discrete melting zones within said melt block, independently operable heating means occupying a major portion of each of said zones, whereby said heating means may be operated at independently variable temperatures according to the melting points of the spinnable mediums introduced into each of said zones.

2. A melting grid as defined in claim 1 wherein said melt block is of substantially constant cross-section throughout its peripheral dimension and wherein said opening is of rectangular configuration in cross-section, whereby temperature variations throughout selected zones of said block are minimized.

3. A melting grid as defined in claim 1 wherein said melt block is of substantially constant cross-section throughout its peripheral dimension, whereby temperature variations throughout selected zones of said block are minimized.

4. In a spinning apparatus for use in the melt spinning of a conjugated filament composed of at least two separate spinnable mediums of possibly differing melting points, the combination of a dual-temperature melting grid and a dual-channeled pump-block, said grid comprising a melt block having a relatively large opening extending therethrough, said opening being divided along its lengthwise dimension by a partition means of thermal insulating properties to thereby define at least two discrete melting zones within said melt block, independently operable heating means occupying a major portion of each of said zones, said pump-block having a depression formed in one end thereof to register with said opening to thereby define a melt pool chamber, said partition means extending to the bottom of said depression in fluid-tight engagement therewith to thereby define at least two discrete melt pool zones, at least two discrete feeder passages communicating through said pump block to register with said melt pool on opposite sides of said partition means, whereby separate spinnable mediums may be transformed into their liquid state according to the melting points of each of such mediums.

References Cited by the Examiner

UNITED STATES PATENTS

| | | | |
|---|---|---|---|
| 2,931,091 | 4/60 | Breen | 18—8 XR |
| 3,017,686 | 1/62 | Breen | 18—8 XR |

FOREIGN PATENTS

| | | |
|---|---|---|
| 561,867 | 11/57 | Belgium. |
| 562,249 | 11/57 | Belgium. |
| 820,918 | 9/59 | Great Britain. |
| 842,758 | 7/60 | Great Britain. |

WILLIAM J. STEPHENSON, *Primary Examiner.*

MICHAEL V. BRINDISI, *Examiner.*